United States Patent [19]

Görres

[11] Patent Number: 4,932,247

[45] Date of Patent: Jun. 12, 1990

[54] WARNING DEVICE FOR THE BRAKE FLUID OF HYDRAULIC BRAKE SYSTEMS OF VEHICLES

[75] Inventor: Bruno Görres, Aichwald, Fed. Rep. of Germany

[73] Assignee: Daimler-Benz AG, Stuttgart, Fed. Rep. of Germany

[21] Appl. No.: 223,365

[22] Filed: Jul. 25, 1988

[30] Foreign Application Priority Data

Jul. 23, 1987 [DE] Fed. Rep. of Germany ....... 3724384

[51] Int. Cl.$^5$ .......................................... G08B 21/00
[52] U.S. Cl. ..................... 73/129; 116/206; 188/1.11; 200/61.04; 340/453
[58] Field of Search ............... 73/129; 340/52 B, 603; 60/534; 188/1.11; 116/206; 200/61.04

[56] References Cited

U.S. PATENT DOCUMENTS

| 3,970,865 | 7/1976 | Kishikawa et al. | 307/116 |
| 4,566,805 | 1/1986 | Klein et al. | 188/1.11 X |

FOREIGN PATENT DOCUMENTS

| 205870 | 5/1986 | European Pat. Off. |
| 2636607 | 11/1978 | Fed. Rep. of Germany. |
| 8607483 | 12/1986 | PCT Int'l Appl. | 200/61.04 |
| 845014 | 8/1960 | United Kingdom. |
| 1100717 | 1/1968 | United Kingdom. |
| 1296858 | 11/1972 | United Kingdom. |

Primary Examiner—Jerry W. Myracle
Attorney, Agent, or Firm—Barnes & Thornburg

[57] ABSTRACT

A warning device for detecting mineral oil impurities in the brake fluid of hydraulic vehicle brake systems is described. The warning device comprises a body which is arranged in the brake fluid and can swell as a result of mineral oil and the change of shape of which indicates the presence of mineral oil impurities. The indication is given particularly as a result of the fact that the change in shape brought about by the swelling causes the opening or closing of an electrical circuit and thereby actuates a visual or acoustic indicator in the dashboard of the vehicle.

9 Claims, 1 Drawing Sheet

WARNING DEVICE FOR THE BRAKE FLUID OF HYDRAULIC BRAKE SYSTEMS OF VEHICLES

BACKGROUND AND SUMMARY OF THE INVENTION

The invention relates to a warning device for the brake fluid of hydraulic brake systems of vehicles, especially motor vehicles.

A series of warning devices for the brake fluid of hydraulic brake systems in vehicles is already known. Thus, for example, it is customary to monitor the fluid level of the brake fluid in the reservoir (see, for example, German Published Examined Application—DE-AS 2,636,607) and generate a warning signal when the fluid level falls below a specific value. It is also known that, as a result of too high a water content of the brake fluid, vapor bubbles can form when the brakes undergo high thermal stress, and this causes the brakes to fail. A warning device reacting to the water content of the brake fluid is therefore also already known (European Patent Application 205,870).

However, the hydraulic brake system can also be damaged as a result of damage to the brake packing or brake sealing rings. Although such damage is detected by a vigilant workshop before complete failure of the brake system results in an accident, nevertheless, a relatively expensive repair must be expected. Sometimes, the damage occurs again even after only a relatively short time, if the old brake fluid or the old brake-fluid reservoir is used again in the repair. It is known that damage to the brake packing or brake sealing rings is caused by even only slight contamination of the brake fluid with mineral oil. Since mineral oil impurities in the brake fluid cannot be detected in the workshop, it has hitherto been impossible to prevent damage from occurring when there is contamination.

An object of the invention is to find a warning device for the brake fluid of hydraulic brake systems of vehicles, by means of which impurities in the brake fluid as a result of mineral oil can be detected at an early stage.

This object is achieved by providing a warning device which includes a body which swells or expands in the presence of mineral oil, which body is arranged in the brake fluid.

The principle of the warning device is that a body which swells in the presence of mineral oil and which thereby triggers a warning signal is arranged in the brake fluid. Since mineral oil contamination usually occurs first in the brake fluid contained in the reservoir, it is preferable for the swelling body to be arranged in the brake fluid there. Thus, the warning signal is emitted at such an early stage that the brake fluid can be exchanged even before the packing or sealing rings of the wheel-brake cylinders, or of the main brake cylinder, are attacked. The material of which the swelling body is made will swell in the presence of mineral oil in the brake fluid, thereby increasing its volume. A suitable material is, for example, that of which the brake packing can also be made, such as natural rubber.

The increase in volume of the swelling body can itself represent the warning signal. However, since a relatively large change in volume is necessary for this, and furthermore, the brake fluid reservoir would have to be opened for inspection, such a solution will be appropriate only in exceptional cases. It is preferable if the warning signal is detectable from outside, in particular by means of an indicator in the dashboard of the vehicle.

Thus, it is advantageous if a clear visual signal is triggered even under only slight swelling. Thus, for example, the swelling body can have a conspicuous color or be covered with a conspicuous color. This conspicuous color is covered with a non-swellable, oil-permeable and visually inconspicuous layer of material. When the body swells, the inconspicuous, non-swellable layer of material tears and thus makes the conspicuous color located underneath visible. Such a color change can be detected through the transparent housing, even without the brake fluid reservoir having to be opened. Another possibility is, as a result of the swelling, to shift a conspicuously marked signal pin, for example guided by the cover of their brake fluid reservoir, in such a way that the swelling can be detected.

It is preferable, however, if the swelling body opens or breaks an electrical circuit as a result of its swelling, and this can be indicated directly on the dashboard of the vehicle.

Other objects, advantages and novel features of the present invention will become apparent from the following detailed description of the invention when considered in conjunction with the accompanying drawings.

BRIEF DESCRIPTION OF THE DRAWINGS

FIG. 2 shows another embodiment of the swelling body and holder.

DETAILED DESCRIPTION OF THE DRAWINGS

Figure 1:
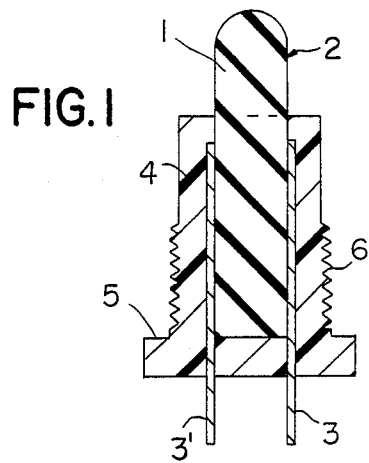
FIG. 1 is a sectional view through a holder and swelling body for detecting mineral oil in a brake fluid reservoir, constructed in accordance with a preferred embodiment of the invention.
Figure 2:
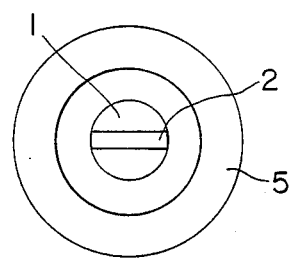
FIG. 2 is an end view of the arrangement of FIG. 1.

FIG. 1 illustrates a swelling body 1 which is fastened in a base 4. The base 4 is equipped with a thread 6 and with a sealing face 5 and can thereby be screwed sealingly into the wall of a brake-fluid reservoir. The swelling body is covered with a very thin electrical conductor track 2 (FIGS. 1 and 2). The electrical conductor track 2 is connected firmly to two solid contact tongues 3 and 3' which are guided outwards through the base 4. The ends of the contact tongues 3 and 3' are appropriately designed so that electrical cable terminals can be slipped onto them. The electrical conductor track 2 can consist of a thin metal foil, but it is also contemplated to produce the conductor track directly on the swelling body by metallization, or coat it onto the swelling body in the form of a non-elastic conductive lacquer according to other preferred embodiments. When mineral oil is present in the brake fluid, the body 1 swells and the conductive track 2 tears. A current flowing through the contact tongue 3, the conductor track 2 and the contact tongue 3' is thus interrupted. This break in the circuit can be utilized in a way known per se for triggering a warning signal. Circuits of this type are sufficiently known from any alarm system with a closed circuit.

Figure 3:
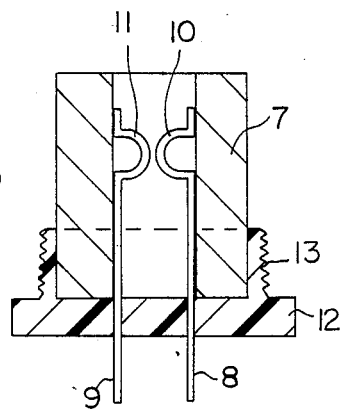

FIG. 3 shows another embodiment of the warning device. The swelling body 7 designed as a hollow cylinder is located in a plastic base 12 which is equipped with a thread 13 for screwing into the brake-fluid reservoir. Guided through the base 12 are leaf-shaped contact springs 8 and 9 which rest against the inner wall of the hollow cylinder 7, and which are bent up to form contact pieces 10 and 11. The contact pieces 10 and 11 can also consist of solid bodies riveted or soldered onto the spring tongues 8 and 9. When the swelling body 7 swells, the contact faces 10 and 11 are pressed against one another. An electrical circuit which actuates a visual or acoustic warning means on the dashboard of the vehicle can thereby be closed. The swelling body 7 can be supported on its outer periphery by means of a metal wire netting or the like. The force exerted inwards is thereby increased. The advantage of the design according to FIG. 3 is that, after the warning device has been activated, it is not necessary to replace the entire unit, for example as in FIGS. 1 and 2, but that only the hollow cylindrical swelling body 7 need be renewed. The responsiveness of the warning device can be varied with wide limits by means of the swellability of the swelling body, as well as by means of the tearing strength of the electrical conductor track 2 or the contact distance between the contact pieces 10 and 11.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Warning device for the brake fluid of hydraulic brake systems of vehicles, wherein in order to detect impurities in the brake fluid as a result of mineral oil, a body which swells in the presence of mineral oil to provide means for triggering a warning signal, is arranged in the brake fluid.

2. Warning device according to claim 1, wherin the body is equipped on its surface with a thin metal film strip which tears when the body swells to provide means for breaking an electrical circuit.

3. Warning device according to claim 2, wherein the body is arranged in a brake fluid reservoir.

4. Warning device according to claim 1, wherein the body is designed as a hollow cylinder, and wherein electrical contacts which close when the body swells are arranged in the hollow space of the cylinder.

5. Warning device according to claim 4, wherein the body is arranged in a brake fluid reservoir.

6. Warning device according to claim 1, wherein the body has a conspicuous color and is covered on its surface with a non-swellable, oil-permeable and visually inconspicuous layer of material which tears when the body swells and which thereby makes the conspicuous color visible.

7. Warning device according to claim 6, wherein the body is arranged in a brake fluid reservoir.

8. Warning device according to claim 1, wherein the body is arranged in a brake fluid reservoir.

9. Warning device according to claim 1, wherein the body consists of natural rubber.

* * * * *